Patented July 30, 1935

2,009,397

UNITED STATES PATENT OFFICE 2,009,397

AZO DYE AND ITS PREPARATION

Richard Frank Goldstein, Prestwich, England, assignor to Imperial Chemical Industries Limited, a corporation of Great Britain No Drawing. Application May 24, 1932, Serial No. 613,265. In Great Britain May 29, 1931

12 Claims. (Cl. 260—76)

This invention relates to a new group of intermediate products and to the utilization of this group to produce azo dyestuffs on the fiber. More particularly this invention relates to azo dyes of the following general formula:

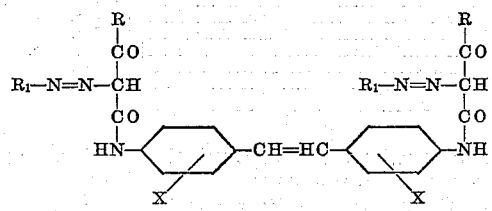

wherein R represents an alkyl group, $R_1$ represents an aromatic nucleus free from sulfo or carboxy groups, and X represents hydrogen or a halogen group.

It is an object of this invention to produce a dye which has exceptional fastness to kier-boiling and chemicking. A further object is to produce a dye which may be developed on the fiber and which dyes the fiber in beautiful brilliant shades.

These objects are attained by the process of the present invention wherein a diamino-stilbene, preferably 4,4'-diamino-stilbene, is reacted with an acylacetic ester, the interaction being effected with the aid of heat and in the presence of a solvent or diluent to which has preferably been added a tertiary organic base, such as pyridine. The material to be dyed is padded in a solution of this compound and then coupled with a diazotized aromatic amino compound which does not contain the sulfo or carboxyl groups.

The invention may be more completely understood by a consideration of the following examples, in which the parts given are by weight:

Example 1

Fifteen (15) parts of ethyl acetoacetate, 66 parts of chlorobenzene, 0.05 parts of pyridine were mixed together and boiled in a reflux apparatus while a suspension of 10 parts of 4:4'-diamino-stilbene in 55 parts of chlorobenzene and 0.05 parts of pyridine was slowly run in. The eventual mixture was then slowly distilled per descensum (with a turned down condenser) until about 55 parts of distillate had been collected. The residue was cooled and filtered. The solid so obtained 4,4'-diacetoacetyl-diamino-stilbene was a yellow crystalline substance.

Example 2

Ten (10) grams of 4,4'-diacetoacetyl-diamino-stilbene were pasted with 30 cc. Turkey red oil and 25 cc. caustic soda 62° Tw.

The paste was warmed and dissolved by the addition of 200 cc. boiling water. The solution was heated until clear then diluted to 1000 cc. total volume. Bleached cotton piece was impregnated by one passage through the above solution, squeezed and dried.

The padded material was developed by working in a solution of 6-chloro-o-toluidine, diazotized and neutralized with sodium acetate in the usual manner. The dyeing was finally given a soaping after treatment for 30 minutes at the boil in a solution containing 3 grms. soap flakes and 2 grms. soda ash per litre. A bright yellow of exceptional fastness to kier-boiling was obtained.

Example 3

One hundred five (105) parts of ethyl acetoacetate, 9.7 parts of 2,2'-dichloro-4,4'-diamino-stilbene and 116 parts of chlorobenzene were mixed and heated rapidly to boiling. 89 parts of distillate were taken off slowly, and the residue in the flask was then cooled and filtered. The solid was purified by solution in aqueous sodium hydroxide and reprecipitated, 12.0 parts of 2:2'-dichloro-4,4'-diacetoacetyl-diamino-stilbene, m. p. 187° C., being obtained.

Example 4

Three (3) parts of 2,2'-dichloro-4,4'-diacetoacetyl-diamino-stilbene were pasted with 9 cc. of Turkey red oil and 1.5 cc. of caustic soda liquor 62° Tw. The paste was dissolved by the addition of 60 parts of boiling water and the solution made up to 1000 cc. with cold water. 14 parts of sodium chloride were added before padding. Bleached cotton pieces were impregnated in the above solution for ½ hour at 25° C. (using a 20:1 liquor).

The padded material was developed in a solution of diazotized o-chloroaniline neutralized with sodium acetate in the usual manner. The dyeing was finally given a soaping after treatment for 30 minutes at the boil in a solution containing 3 parts soap flakes and 2 parts soda ash per litre. A bright yellow of excellent fastness to kier-boiling and severe chemicking was obtained.

The following table gives the shades obtained when other dyeings are made in accordance with the present invention. The dyeings have exceptional fastness to kier-boiling and chemicking, in addition to exceptional tinctorial strength.

but this is merely one of many compounds which may be used in practicing the process of the present invention. Other compounds which give excellent results are toluene and xylene.

The coupling components referred to supra are described and claimed in a copending application Serial No. 682,630, filed July 28, 1933.

The products of the present invention have unexpectedly pronounced properties which render them greatly superior to other diacylacetyl derivatives of diamines formerly known. For instance, the products of Examples 1 and 3, supra,

| Diazotized amine used | Padding compound | Shade |
|---|---|---|
| o-chloroaniline | Diacetoacetyl-4,4'-diamino-stilbene | Yellow. |
| 5-chloro-o-toluidine | do | Do. |
| m-chloroaniline | do | Do. |
| 4-chloro-o-anisidine | do | Dark yellow. |
| 6-chloro-o-toluidine | do | Yellow. |
| 4-chloro-o-toluidine | do | Do. |
| 4-nitro-o-anisidine | do | Do. |
| 4-nitro-o-toluidine | do | Do. |
| 2,5-dichloroaniline | do | Dark yellow. |
| m-nitro-p-toluidine | do | Orange. |
| o-nitroaniline | do | Do. |
| 5-nitro-o-toluidine | do | Deep orange. |
| p-chloro-o-nitroaniline | do | Do. |
| 5-nitro-o-anisidine | do | Do. |
| Dianisidine | do | Dark orange-brown. |
| o-chloroaniline | Diacetoacetyl-2, 2'-dichloro-4,4'-diamino-stilbene | Yellow. |
| m-chloroaniline | do | Do. |
| 2,5-dichloroaniline | do | Do. |
| 5-chloro-o-toluidine | do | Do. |
| 4-chloro-o-toluidine | do | Do. |
| 6-chloro-o-toluidine | do | Reddish-yellow. |
| m-nitro-p-toluidine | do | Orange. |
| p-chloro-o-nitroaniline | do | Do. |
| 5-nitro-o-anisidine | do | Deep orange. |
| 5-nitro-o-toluidine | do | Do. |
| 3-nitro-p-anisidine | do | Do. |

In the above examples instead of using the dichloro-diamino-stilbene compound the corresponding dibromo-diamino-stilbene may be used with very satisfactory results. Numerous aromatic amino compounds have been diazotized and coupled to the diacetoacetyl-diamino-stilbene group in the above examples, however these compounds serve merely for the purpose of illustration and are not intended to limit, in any way, the scope of the present invention, since it is possible to take other amino compounds of the naphthalene as well as the benzene series and diazotize and couple them to the diacetoacetyl-diamino-stilbene group. These compounds should not contain a sulfo or carboxyl group and best results are obtained if they do not contain the cyano group.

The molecular ratio of the acylacetic ester to the diamino-stilbene is preferably 2:1 respectively, although it is quite possible to vary this ratio within rather wide limits without decreasing, to an appreciable extent, the superiority of the product produced by the present process. It is also advantageous to add a tertiary organic base to the solvent or diluent, pyridine having been found to give excellent results. Chlorobenzene has been used as a solvent or diluent when coupled with diazotized chloroaniline, on cotton, showed the same depth of shade as three times their weight of diacetoacetyl-ortho-tolidide.

As many apparently widely different embodiments of this invention may be made without departing from the spirit and scope thereof, it is to be understood that I do not limit myself to the specific embodiments thereof except as defined in the appended claims.

I claim:

1. A process for producing azo dyes which comprises coupling a diazotized aromatic amine free from sulfo or carboxy groups with a compound having the following general formula:

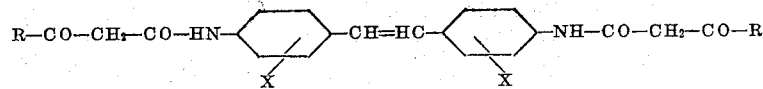

wherein R represents an alkyl group and X represents hydrogen or a halogen group.

2. A process for producing azo dyes which comprises coupling a diazotized aromatic amine of the benzene or naphthalene series free from sulfo or carboxy groups with a compound having the following general formula:

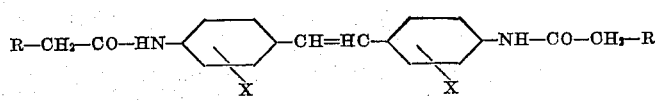

wherein R represents an acyl group and X represents hydrogen or a halogen group.

3. A process for producing azo dyes which comprises coupling a diazotized aromatic amine of the benzene series, free from sulfo or carboxy groups, with a compound having the following general formula:

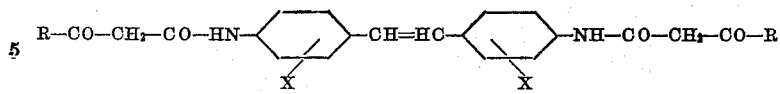

wherein R represents an alkyl group and X represents hydrogen or a halogen group.

4. A process for producing azo dyes which comprises coupling a diazotized aromatic amine of the benzene series, free from sulfo or carboxy groups, with a compound having the following general formula:

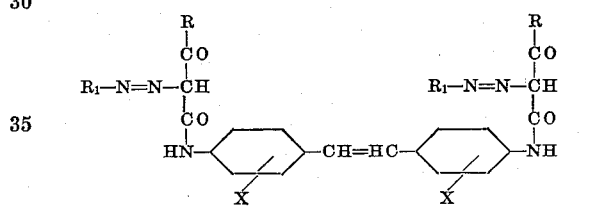

wherein X represents hydrogen or a halogen group.

5. A process for producing azo dyes which comprises coupling diazotized 6-chloro-o-toluidine with 4,4'-diacetoacetyl-diamino-stilbene.

6. A process for producing azo dyes which comprises coupling diazotized o-chloroaniline with 2,2'-dichloro-4,4'-diacetoacetyl-diamino-stilbene.

7. An azo dye having the following general formula:

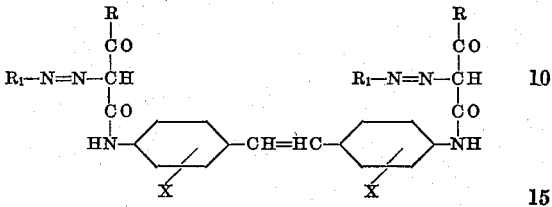

wherein R represents an alkyl group, $R_1$ represents an aromatic nucleus free from sulfo or carboxy groups, and X represents hydrogen or a halogen group.

8. An azo dye having the following general formula:

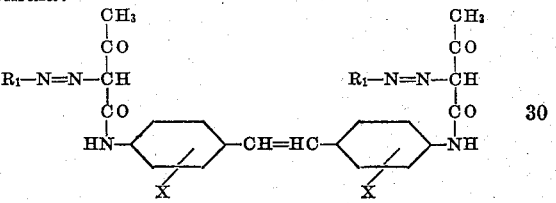

wherein R represents an acyl group, $R_1$ represents an aromatic nucleus of the benzene or naphthalene series free from sulfo or carboxy groups, and X represents hydrogen or a halogen group.

9. An azo dye having the following general formula:

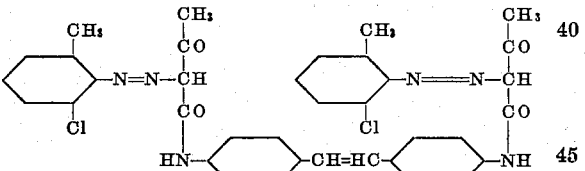

wherein R represents an alkyl group, $R_1$ represents an aromatic nucleus of the benzene series, free from sulfo or carboxy groups, and X represents hydrogen or a halogen group.

10. An azo dye having the following general formula:

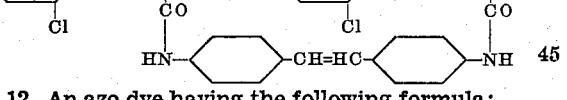

wherein $R_1$ represents an aromatic nucleus of the benzene series, free from sulfo or carboxy groups, and X represents hydrogen or a halogen group.

11. An azo dye having the following formula:

12. An azo dye having the following formula:

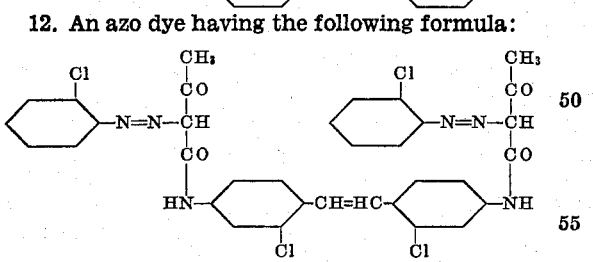

RICHARD FRANK GOLDSTEIN.